United States Patent
Choi et al.

(10) Patent No.: US 7,615,248 B2
(45) Date of Patent: Nov. 10, 2009

(54) METHOD FOR PREPARING BLUE-EMITTING BARIUM MAGNESIUM ALUMINATE (BAM) PHOSPHOR FOR BLACKLIGHT UNIT LAMP, AND BLUE-EMITTING BAM PHOSPHOR PREPARED BY THE METHOD

(75) Inventors: Kwang-wook Choi, Daejeon (KR); Chang-seok Ryoo, Daejeon (KR); Do-hoon Kim, Daejeon (KR); Ick-soon Kwak, Daejeon (KR); Tae-hyun Kwon, Daejeon (KR)

(73) Assignee: Daejoo Electronic Materials Co., Ltd., Kyunggi-do (KR)

( * ) Notice: Subject to any disclaimer, the term of this patent is extended or adjusted under 35 U.S.C. 154(b) by 269 days.

(21) Appl. No.: 11/319,485

(22) Filed: Dec. 29, 2005

(65) Prior Publication Data

US 2006/0169950 A1    Aug. 3, 2006

(30) Foreign Application Priority Data

Feb. 1, 2005    (KR) .................... 10-2005-0009069

(51) Int. Cl.
*B05D 1/12* (2006.01)
*B05D 5/06* (2006.01)
*B05D 7/00* (2006.01)
*C09K 11/02* (2006.01)
*C09K 11/77* (2006.01)

(52) U.S. Cl. .................... 427/180; 427/64; 427/67; 427/71; 427/212; 252/301.4 R; 428/403; 428/404

(58) Field of Classification Search .......... 252/301.4 R, 252/301.5, 301.6 R, 301.6 S, 301.6 P, 301.6 F, 252/301.4 S, 301.4 P, 301.4 F; 428/404, 428/403; 427/64, 67, 71, 180, 212
See application file for complete search history.

(56) References Cited

U.S. PATENT DOCUMENTS

| 4,544,605 | A | * | 10/1985 | Miyazaki et al. | ............ 428/404 |
| 5,859,496 | A | * | 1/1999 | Murazaki et al. | ............ 313/485 |
| 6,222,312 | B1 | * | 4/2001 | Ghosh et al. | ................. 313/487 |
| 6,617,781 | B2 | * | 9/2003 | Murazaki et al. | ............ 313/486 |
| 7,375,459 | B2 | * | 5/2008 | Yoshida et al. | ............... 313/486 |

FOREIGN PATENT DOCUMENTS

| JP | 4-280031 | 10/1992 |
| JP | 9-231944 | 9/1997 |
| JP | 11-172244 | 6/1999 |

(Continued)

*Primary Examiner*—Karl E Group
*Assistant Examiner*—Noah S Wiese
(74) *Attorney, Agent, or Firm*—McKenna Long & Aldridge LLP

(57) ABSTRACT

Provided are a method for preparing a blue-emitting BAM phosphor which includes: surface-treating phosphor particles with metal oxide nanoparticles, and a blue-emitting BAM phosphor prepared by the method. The blue-emitting BAM phosphor exhibits better dispersibility and flowability in coating slurry without undergoing a reduction in initial brightness, thereby providing less color variation at ends of a BLU lamp. The blue-emitting BAM phosphor can be directly applied in a currently available method of manufacturing a BLU lamp, and when mixed with existing red and green phosphors, can remarkably reduce color variation at ends of a lamp. Therefore, the quality of a BLU lamp for large-scale displays can be greatly improved.

6 Claims, 2 Drawing Sheets

FOREIGN PATENT DOCUMENTS

| | | | |
|---|---|---|---|
| JP | H11172244 A * | 6/1999 | |
| JP | 2001-110309 | 4/2001 | |
| JP | 2002-348570 | 12/2002 | |
| JP | 2003-147350 | 5/2003 | |
| JP | 2003-226872 | 8/2003 | |
| JP | 2004-186090 | 7/2004 | |
| JP | 2004-244604 | 9/2004 | |

* cited by examiner

[FIG. 1]
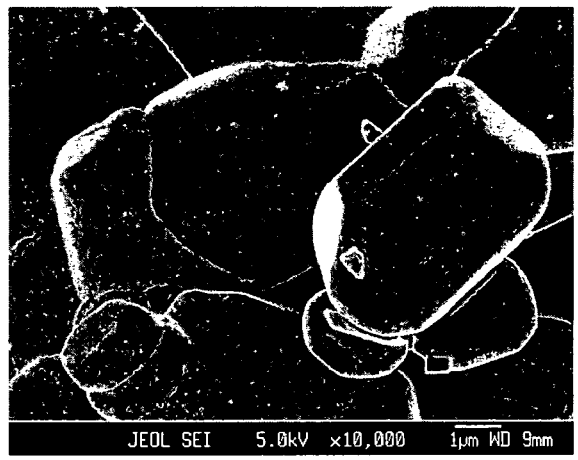
[FIG. 2]
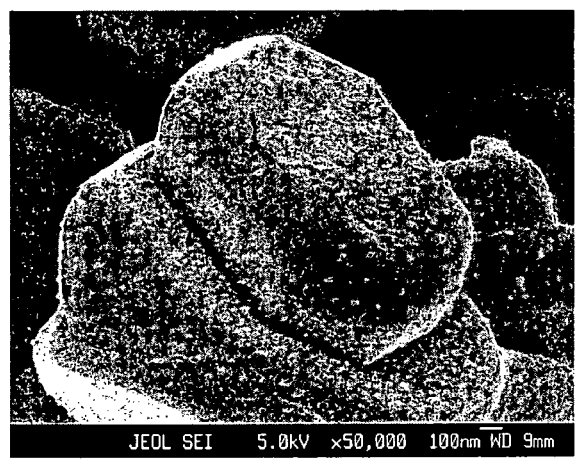
[FIG. 3]
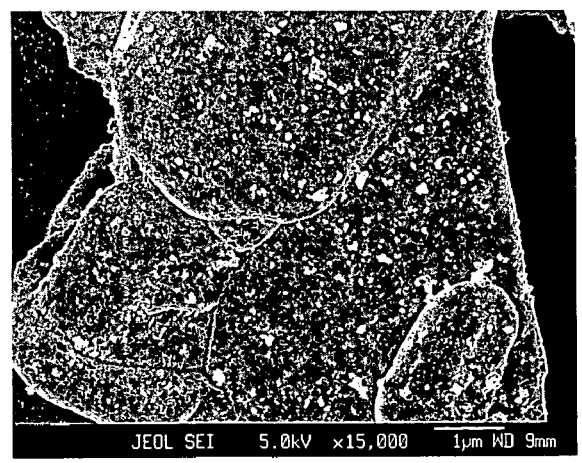

[FIG. 4]
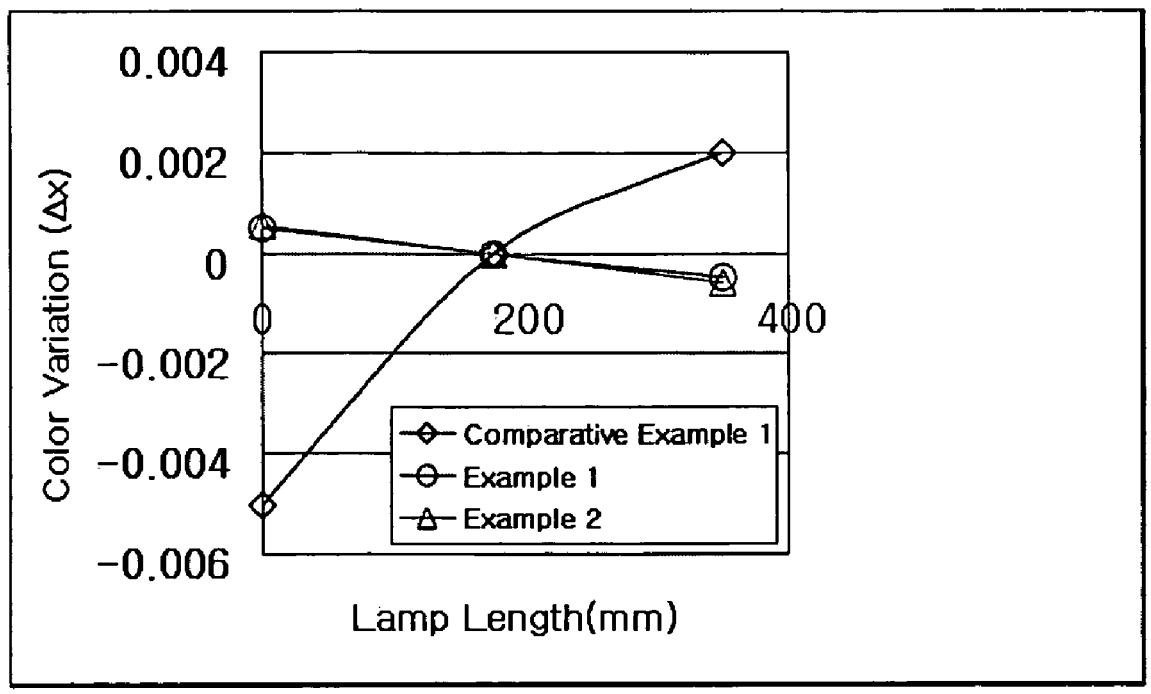
[FIG. 5]
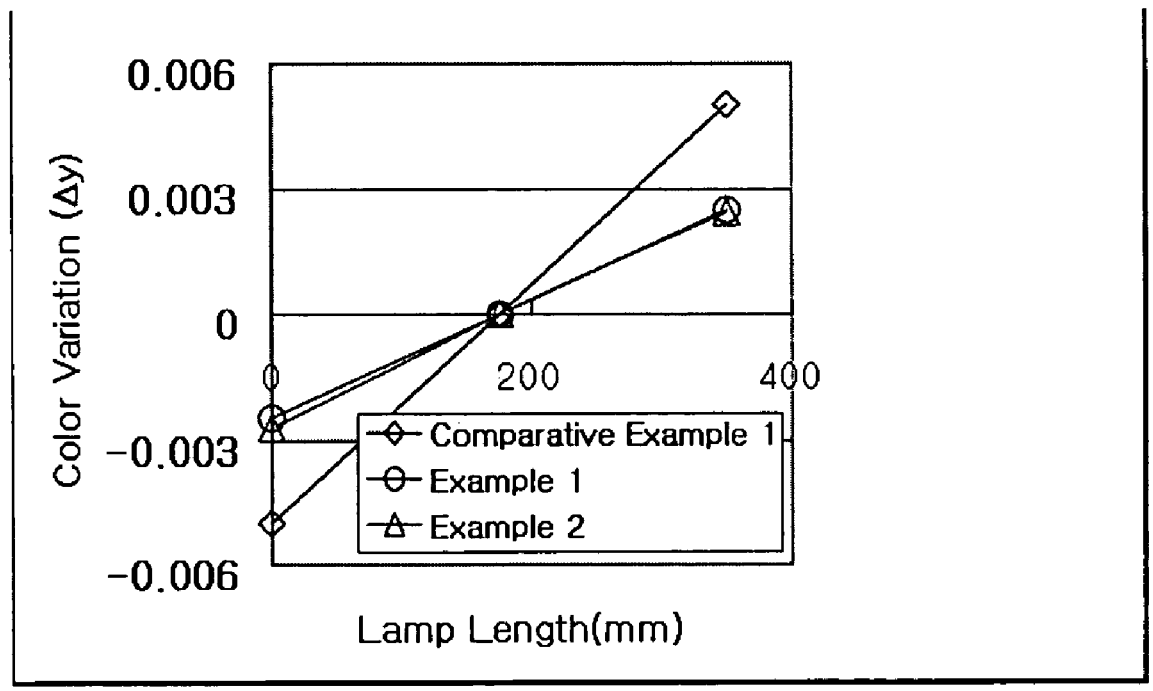

METHOD FOR PREPARING BLUE-EMITTING BARIUM MAGNESIUM ALUMINATE (BAM) PHOSPHOR FOR BLACKLIGHT UNIT LAMP, AND BLUE-EMITTING BAM PHOSPHOR PREPARED BY THE METHOD

This application claims the benefit of Korean Patent Application No. 10-2005-0009069 filed Feb. 1, 2005 in Korea, which is hereby incorporated by reference in its entirety.

TECHNICAL FIELD

The present invention relates to a method for preparing a blue-emitting barium magnesium aluminate (BAM) phosphor and a novel blue-emitting BAM phosphor prepared therefrom. More particularly, the present invention relates to a method for preparing a blue-emitting BAM phosphor in which phosphor particles are surface-treated with metal oxide nanoparticles, and a blue-emitting BAM phosphor prepared therefrom.

BACKGROUND ART

Barium magnesium aluminate (BAM; [$(Ba,Eu^{2+})MgAl_{10}O_{17}$]) has been widely used as a blue-emitting phosphor in Plasma Display Panels (PDPs), three wavelengths fluorescent lamps, or Cold Cathode Fluorescent Lamps (CCFLs) or External Electrode Fluorescent Lamps (EEFLs) for Back Light Units (BLUs) of Liquid Crystal Displays (LCDs).

Unlike PDPs achieving white chromaticity coordinates by separately coating red, green and blue phosphors, CCFLs or EEFLs achieve white chromaticity coordinates by coating an inner part of a glass tube with a slurry obtained by mixing red, green, and blue phosphors in an appropriate ratio, followed by drying and sintering.

In such a phosphor coating for CCFLs, color variation at ends of a CCFL caused by mixing red, green, and blue phosphors with different specific gravities, sizes, shapes, and flowabilities makes the use of the CCFL as a high-quality optical source for displays difficult.

Furthermore, in the above-mentioned slurry coating for CCFLs, the ends and middle portion of the inner wall of a CCFL have a differential thickness of a phosphor layer, thereby leading to brightness variation.

Generally, color and brightness variations at ends of a lamp increase as the length of the lamp increases. Currently, the sizes of display products are increasing, and the lengths of related CCFLs and EEFLs are increasing accordingly. Thus, there is an increasing need to solve the color and brightness variation in CCFLs and EEFLs.

In view of these problems, many studies have been done. However, most studies are related to a slurry coating process achieving brightness uniformity by uniformly forming a phosphor layer on the inner wall of a lamp.

Japanese Patent Laid-Open Publication No. 2001-110309 discloses an aqueous slurry coating method. According to the aqueous slurry coating method, however, considering the fact that currently available CCFLs or EEFLs have mainly a lamp diameter of 5 mm or less, moisture removal after the coating requires a longer time, and twice-coating is required to reduce a thickness difference at ends of a lamp.

Japanese Patent Laid-Open Publication No. Hei. 4-280031 discloses a process for coating a lamp with a slurry containing an organic solvent in such a way that the slurry flows along the axial direction of the lamp from the upper end of the lamp. This process requires primary coating, drying, and sintering; turning upside down of the lamp; and secondary coating, drying, and sintering, to obtain uniform coating at ends of the lamp. According to this process, however, there is formed a crown-type phosphor layer in which the thickness of ends of the lamp is thicker than that of the center portion of the lamp. As a lamp length increases, this phenomenon leads to larger color and brightness variations at ends of a lamp.

Recently published Japanese Patent Laid-Open Publication No. 2004-186090 discloses a method of forming a phosphor layer, which includes preparing a coating solution of a phosphor-binder slurry with a viscosity of 30 cP or more using an organic solvent; applying the coating solution onto an inner wall of a lamp using a suction pipe by once coating; drying the coating with a flowing gas; and sintering the dried coating. This method is the most widely used method for manufacturing CCFLs but is insufficient in achieving less color variation and better brightness uniformity along the lengthwise direction of a glass tube.

The above-described prior arts for enhancing brightness uniformity at ends of lamps have been focused on development of better slurry preparation or coating methods rather than on development of better phosphors.

In this regard, the present invention provides a BLU lamp for LCD which offers less color variation at ends of the BLU lamp by improving the characteristics of phosphors. For this, the present invention provides a novel BAM phosphor in which phosphor particles are surface-modified with metal oxide nanoparticles, and a method for preparing the same.

The surface-treatment of phosphors with metal oxide was conducted for various different types of purposes. Japanese Patent Laid-Open Publication Nos. Hei. 11-172244, Hei. 9-231944, 2002-348570, 2003-147350, 2003-226872, 2004-244604, etc. reported that brightness degradation by vacuum ultraviolet radiation was reduced by forming a rare earth oxide film to a thickness of 5 to 100 nm by surface coating of phosphor particles with nitric acid and metal oxide such as $La_2O_3$, $Y_2O_3$, $SiO_2$, and $Gd_2O_3$ (Japanese Patent Laid-Open Publication No. Hei. 11-1722440), or by forming a rare earth carbonate film by surface coating of phosphor particles with rare earth metal carbonate (Japanese Patent Laid-Open Publication Nos. 2003-147350, 2003-226872, and 2004-244604). These patent documents mentions color or brightness variation at ends of a lamp but is silent about initial brightness degradation of a phosphor due to coating. The formation of a protection film on a surface of a phosphor induces a change in emission efficiency according to a coating amount. As the coating amount increases, reduction in emission efficiency increases but brightness maintenance rate increases. Furthermore, a coating material serves as a protection film but may serve as a binder, thereby causing the agglomeration of phosphor particles. The agglomerated phosphor particles may not form a uniform coating film in actual use due to poor dispersion property, thereby leading to unevenness in chromaticity coordinates and brightness.

DISCLOSURE OF THE INVENTION

In view of these problems, the present invention provides a blue-emitting BAM phosphor in which phosphor particles are surface-treated with metal oxide nanoparticles to offer less color variation at ends of a BLU lamp without lowering initial brightness, and a method for preparing the same.

Therefore, according to an aspect of the present invention, there is provided a method for preparing a blue-emitting BAM[$(M^{11},Eu^{2+})MgAl_{10}O_{17}$] phosphor, which includes:

surface-treating phosphor particles with metal oxide particles having a particle size of 10 to 100 nm.

According to another aspect of the present invention, there is provided a blue-emitting BAM phosphor prepared by the method.

According to yet another aspect of the present invention, there is provided a BLU lamp using the blue-emitting BAM phosphor.

Generally, color variation at ends of a lamp is caused by different sedimentation rates of red, green, and blue phosphors. According to the Stokes equation represented by $U = \{[((\rho_p - \rho_o) \times g)/18\eta] \times dp^2\}$ where U is a sedimentation rate, $\rho_p$ is the specific gravity of a phosphor, $\rho_o$ is the density of a solvent, g is the acceleration of gravity, $\eta$ is the viscosity of slurry, and $d_p$ is an average particle size of a phosphor, the sedimentation rate of a phosphor is affected by the specific gravity of the phosphor, the particle size of the phosphor, the density of a solvent, the viscosity of slurry, etc. Here, the specific gravity of a phosphor and the density of a solvent are the intrinsic characteristics of materials unaffected by external factors. To change the particle size of a phosphor and the viscosity of slurry, it is necessary to change a phosphor preparation method or a phosphor coating method. However, it has a difficulty in direct application for lamp fabrication.

In this regard, while searching for a method of reducing color variation at ends of a lamp by surface-modification of an existing phosphor, the present inventors found that non-uniform distribution of a blue phosphor during phosphor slurry coating was a main causative factor of color variation at ends of a lamp, and was caused by particle shape difference in the blue phosphor and the other phosphors (red and green phosphors).

Generally, red and green phosphor particles have a shape of rounded gravel, whereas blue phosphor particles have a plate shape. Thus, it is thought that the red, green, and blue phosphors have different flowabilities in slurry even when they have the same particle size. It is also thought that the red, green, and blue phosphors are different in the degree of particle agglomeration.

In this regard, considering differential particle shapes of red, green, and blue phosphors, in addition to differential intrinsic densities of the red, green, and blue phosphors (blue phosphor is relatively low as 3.8, red phosphor is 5.1, and blue phosphor is 5.2), the present invention is focused on improvement of flowability and prevention of agglomeration of the blue phosphor.

To improve the flowability of a blue phosphor, the present inventors developed a surface-treatment of blue phosphor particles with metal oxide nanoparticles (e.g., $La_2O_3$, $SiO_2$, $Y_2O_3$, or $ZrO_2$). It is thought that the metal oxide nanoparticles uniformly coated on a surface of the blue phosphor serve as a solid lubricant reducing a friction between the blue phosphor and the other phosphors in slurry to increase the flowability of the blue phosphor. Such an improvement in the flowability of a blue phosphor compensates for a difference in flowabilities of red, green, and blue phosphors due to different particle shapes, thereby reducing a distribution difference of the red, green, and blue phosphors in slurry, resulting in reduction in color variation at ends of a lamp.

The metal oxide nanoparticles uniformly coated on a surface of the blue phosphor also serve to prevent the agglomeration of the blue phosphor particles. Such agglomeration prevention of the blue phosphor particles, together with better flowability of the blue phosphor particles, contributes greatly to reduction in color variation at ends of a lamp.

Preferably, the metal oxide has a particle size of 100 nm or less, and more preferably 10 to 100 nm, to offer effective surface modification. If the particle size of the metal oxide exceeds 100 nm, it may be difficult to form a uniform coating during surface-treatment due to the weight of the metal oxide. Furthermore, absorption of a phosphor excitation source (vacuum ultraviolet light generated from a lamp) may be inhibited. On the other hand, if the particle size of the metal oxide is less than 10 nm, it may be difficult to maintain the dispersibility of the metal oxide during surface treatment and to control the self-agglomeration of the metal oxide.

The emission efficiency of a blue phosphor is also affected by the amount of the metal oxide nanoparticles. If the amount of the metal oxide nanoparticles is too small, flowability improvement and agglomeration preventive effects may be insignificant. On the other hand, if the amount of the metal oxide nanoparticles is too large, the emission efficiency of a blue phosphor may be lowered. In this regard, the amount of the metal oxide nanoparticles may be a range from 0.05 to 5.0 parts by weights based on the weight of a blue phosphor.

The surface treatment of a blue phosphor with metal oxide nanoparticles must satisfy the following two factors. First, self-agglomeration between the metal oxide nanoparticles must be prevented to uniformly distribute the metal oxide nanoparticles on a surface of the blue phosphor. Second, the metal oxide nanoparticles must be bound to a surface of the blue phosphor by an appropriate electrostatic force. The electrostatic binding force between the metal oxide nanoparticles and the blue phosphor must be enough strong so that the metal oxide nanoparticles are not separated from the surface of the blue phosphor during manufacturing a lamp.

In this regard, prevention of agglomeration between the metal oxide nanoparticles and appropriate binding between the blue phosphor and the metal oxide nanoparticles can be accomplished by varying the pH of a coating solution for surface treatment of the blue phosphor with the metal oxide nanoparticles.

Preferably, the pH of the coating solution for the surface treatment is a range from 7 to 11. A narrower pH range is more preferable for specific metal oxide. For example, the surface treatment may be optimally performed at pH 10-11 for $La_2O_3$, at pH of 7-10 for $SiO_2$, at pH 9-11 for $Y_2O_3$, and at pH 9-11 for $ZrO_2$. A base used for pH adjustment may be an organic base containing no metal cation to prevent the remaining of metal cations on a surface of the blue phosphor after surface treatment. Thus, it is preferable to use ammonium hydroxide or aqueous amine such as dimethylamine, ethylmethylamine, propylamine, or isopropylamine.

A BAM phosphor surface-modified with metal oxide nanoparticles can be prepared using the following illustrative method.

(Preparation)

A blue-emitting BAM phosphor is dispersed in distilled water. At this time, the weight ratio of the BAM phosphor to the distilled water is adjusted to a range from 1:2 to 1:4. The phosphor solution is stirred for 10 to 30 minutes and a dispersion solution of metal oxide with a particle size of 10-100 nm is gradually added to the phosphor solution. At this time, the metal oxide is used in an amount of 0.05 to 5 parts by weight based on the weight of the BAM phosphor. Then, an organic base solution is added to the resultant solution with stirring so that the pH of the reaction solution is adjusted to 7-11. After the pH adjustment, the reaction solution is stirred for one hour to precipitate the BAM phosphor, the supernatant is removed, and the precipitate is dried in a 100° C. oven.

BRIEF DESCRIPTION OF THE DRAWINGS

FIG. 1 is a Field Emission Scanning Electron Microscopic (FESEM) image of an untreated blue-emitting BAM phosphor;

FIG. 2 is a FESEM image of a blue-emitting BAM phosphor surface-treated with $SiO_2$ nanoparticles;

FIG. 3 is a FESEM image of a blue-emitting BAM phosphor surface-treated with $La_2O_3$ nanoparticles; and FIGS. 4 and 5 are graphs illustrating chromaticity variations $\Delta$ x and $\Delta$ y at ends of each lamp measured in Experimental Example 1.

BEST MODE FOR CARRYING OUT THE INVENTION

Hereinafter, the present invention will be described specifically by Examples. However, the following Examples are provided only for illustrations and thus the scope of the present invention is not limited to or by them.

COMPARATIVE EXAMPLE 1

Preparation of a Conventional Blue-emitting BAM Phosphor

Ba, Eu, Mg, and Al were mixed in a molar ratio of 0.9:0.1:1.0:10 and an appropriate amount of $AlF_3$ as a flux was added thereto. Then, the mixture was sintered under a mixed gas atmosphere of nitrogen and hydrogen (95:5, v/v) at 1,400° C. for 2 hours.

The sintered body thus obtained were ball-milled, washed with water, and dried to give a blue-emitting BAM phosphor with a composition of $Ba_{0.9}Eu_{0.1}MgAl_{10}O_{17}$ (BAM: $Eu^{2+}$).

EXAMPLE 1

600 g of the BAM: $Eu^{2+}$ phosphor prepared in Comparative Example 1 was dispersed in 2 L distilled water, and 24 g of a $La_2O_3$ dispersion solution (10 parts by weight of $La_2O_3$ based on the weight of the BAM: $Eu^{2+}$ phosphor) was gradually added thereto with stirring. The mixed solution was set to pH of 10 with ammonium hydroxide, stirred for one hour, and left stand. Then, the precipitate was isolated and dried in a 100° C. oven, to give a surface-modified blue-emitting BAM phosphor.

EXAMPLE 2

A surface-modified blue-emitting BAM phosphor was prepared in the same manner as in Example 1 except that 6 g of a $SiO_2$ dispersion solution (10 parts by weight of $SiO_2$) was used instead of 24 g of the $La_2O_3$ dispersion solution.

FIG. 2 is FESEM images of the blue-emitting BAM phosphor surface-treated with $SiO_2$ nanoparticles of Example 2 and FIG. 3 is the blue-emitting BAM phosphor surface-treated with $La_2O_3$ nanoparticles of Example 1, respectively.

As shown in FIGS. 2 and 3, the $SiO_2$ and $La_2O_3$ nanoparticles were surface-adsorbed at pH of 7 to 11 and uniformly dispersed and distributed onto surfaces of the blue-emitting BAM phosphors. Even after ball-milling or slurry combination, the separation of the metal oxide nanopartices from the phosphor particles was not observed.

EXAMPLE 3

A surface-modified blue-emitting BAM phosphor was prepared in the same manner as in Example 1 except that 12 g of an $Y_2O_3$ dispersion solution (10 parts by weight of $Y_2O_3$) was used instead of 24 g of the $La_2O_3$ dispersion solution.

EXAMPLE 4

A surface-modified blue-emitting BAM phosphor was prepared in the same manner as in Example 1 except that 9 g of a $ZrO_2$ dispersion solution (10 parts by weight of $ZrO_2$) was used instead of 24 g of the $La_2O_3$ dispersion solution.

EXPERIMENTAL EXAMPLE 1

Color Variation at Ends of BLU Lamp

BLU lamps were manufactured using the blue phosphors prepared in Comparative Example 1 and Examples 1-4, and conventional red and green phosphors ($Y2O3$:Eu for red phosphor and $(La,Ce)PO_4$:Tb for green phosphor). The red, green, and blue phosphors were mixed in a weight ratio of 43.60:33.20: 23.20. 500 g of the red, green, and blue phosphors were mixed with 250 ml of a mixed solution of IPA (isopropyl alcohol) and BA (butyl acetate) (50:50), 40 ml of NA slurry as a binder, and 2 ml of a neutralization solution, and the viscosity of the mixed solution was set to 10 Sec using a NC (NitroCellulose) solution. The mixed solution was rolled for 72 hours and coated on a lamp. The standard size of test lamps was as follows: $\phi$=2.4 mm and L=350 mm, and the chromaticity coordinates of the central portion of the lamps was as follows: x=0.3, y=0.3.

Color variation at ends of a lamp was represented by the sum ($\Delta$x, $\Delta$y) of differences between the chromaticity coordinates at ends of the lamps and the chromaticity coordinates at the central portion of the lamp. Thus, as $\Delta$x and $\Delta$y values decrease, color variation at ends of a lamp decreases.

As shown in Table 1 below and FIGS. 4 and 5, the lamps manufactured using the blue-emitting BAM phosphors surface-modified with metal oxide nanoparticles of Examples 1 and 2 exhibited less color variation compared to the lamp manufactured using the conventional BAM phosphor of Comparative Example 1.

The $\Delta$ x and $\Delta$ y values of the lamp using the blue phosphor of Example 1 were respectively only 14% and 50% of those of the lamp using the conventional blue phosphor of Comparative Example 1. The lamps using the blue phosphors of Examples 2-4 also exhibited a similar improvement effect in color variation to the lamp using the blue phosphor of Example 1.

The lamps using the blue phosphors surface-treated with metal oxide nanoparticles of Examples 1-4 exhibited no brightness degradation compared with the lamp using the conventional blue phosphor of Comparative Example 1. This reveals that a surface treatment of the present invention is effective in improving the flowability of a blue phosphor while maintaining the emission characteristics of the blue phosphor.

TABLE 1

| Example | Brightness[1] (cd/m$^2$) | $\Delta$x | $\Delta$y |
|---|---|---|---|
| Comparative Example 1 | 43,000 | 0.0070 | 0.010 |
| Example 1 | 43,600 | 0.0010 | 0.0050 |

TABLE 1-continued

| Example | Brightness[1] (cd/m$^2$) | Δx | Δy |
|---|---|---|---|
| Example 2 | 43,700 | 0.0012 | 0.0051 |
| Example 3 | 43,000 | 0.0015 | 0.0057 |
| Example 4 | 42,900 | 0.0018 | 0.0060 |

Note
[1]test lamps had Φ = 2.4 mm, L = 350 mm, and chromaticity coordinates of x = 0.3, y = 0.3 at central portion A blue-emitting BAM phosphor uniformly surface-treated with metal oxide nanoparticles exhibits better flowability in a powder form. Thus, the metal oxide nanoparticles serve as a solid lubricant reducing the friction between the blue phosphor and the other phosphors during actual lamp slurry preparation and slurry coating, thereby increasing the flowability of the blue phosphor in slurry. Such an improvement in the flowability of the blue phosphor reduces a difference in flowability due to different particle shapes of the red, green, and blue phosphors, thereby reducing a distribution variation of the red, green, and blue phosphors in slurry, resulting in reduction in color variation at ends of a lamp.

EXPERIMENTAL EXAMPLE 2

Color Variation at Ends of BLUE Lamp with Respect to pH Change

In this Experimental Example, a change in color variation at ends of a lamp with respect to pH was investigated to determine an optimal surface treatment condition. For this, the BAM: Eu$^{2+}$ phosphor of Comparative Example 1 was dispersed in distilled water, and a La$_2$O$_3$ dispersion solution (10 parts by weight of La$_2$O$_3$ based on the weight of the phosphor) was gradually added thereto with stirring. Color variations of lamps were measured under different pH conditions with ammonium hydroxide as presented in Table 2 below. The results are presented in Table 2. In this Experimental Example, the lamps were manufactured in the same manner as in Experimental Example 1.

TABLE 2

| | | pH | | | | |
|---|---|---|---|---|---|---|
| | | 7 | 8 | 9 | 10 | 11 |
| Color variation | ☐Δx | 0.006 | 0.005 | 0.002 | 0.001 | 0.001 |
| | ☐Δy | 0.0095 | 0.0083 | 0.0064 | 0.0050 | 0.0052 |

As presented in Table 2, the lamps using the blue phosphors surface-treated with the La$_2$O$_3$ dispersion solution at pH 7-11 exhibited color variations appropriate for practical applications. In particular, the lamps using the blue phosphors surface-treated with the La$_2$O$_3$ dispersion solution at pH 10-11 exhibited more preferable minimal color variations. These results reveal that pH is an important factor in the surface treatment of a blue phosphor with metal oxide nanoparticles, that is, that an appropriate pH condition leads to prevention of agglomeration of metal oxide nanoparticles and appropriate binding between the blue phosphor and the metal oxide nanoparticles, thereby improving the flowability of the blue phosphor.

INDUSTRIAL APPLICABILITY

As apparent from the above description, a blue-emitting BAM phosphor prepared according to a method of the present invention exhibits better dispersibility and flowability in coating slurry without undergoing a reduction in initial brightness, thereby providing less color variation at ends of a BLU lamp. Therefore, the quality of BLU lamps used for large-scale displays can be remarkably improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method comprising: preparing a blue-emitting BAM [(Ba,Eu$^{2+}$)MgAl$_{10}$O$_{17}$]phosphor by surface-treating phosphor particles with metal oxide particles having a particle size of 10 to 100 nm in an aqueous medium of pH 7 to 11, and coating an inner part of a glass tube of a white light emitting lamp with a slurry obtained by mixing the BAM[(Ba,Eu$^{2+}$)MgAl$_{10}$O$_{17}$] phosphor with red and green phosphors.

2. The method of claim 1, wherein pH is adjusted using at least one organic base selected from the group consisting of ammonium hydroxide, and aqueous amine selected from dimethylamine, ethylmethylamine, propylamine, and isopropylamine.

3. The method of claim 1, wherein the metal oxide particles are La$_2$O$_3$, SiO$_2$, Y$_2$O$_3$, or ZrO$_2$.

4. The method of claim 1, wherein the amount of the metal oxide particles ranges from 0.05 to 5 parts by weight based on the weight of the phosphor particles.

5. The method of claim 1, wherein the metal oxide particles are uniformly dispersed on surfaces of the phosphor particles while maintaining the original shape of the phosphor particles.

6. A backlight unit lamp prepared by the method of claim 1.

* * * * *